Jan. 26, 1943.　　　　L. E. JAMES　　　　2,309,595
MECHANICAL MOVEMENT
Filed Dec. 7, 1940　　　　7 Sheets-Sheet 1

INVENTOR
Lester E. James
By his attorney
Victor Cobb

Jan. 26, 1943.　　　　L. E. JAMES　　　　2,309,595
MECHANICAL MOVEMENT
Filed Dec. 7, 1940　　　　7 Sheets-Sheet 3
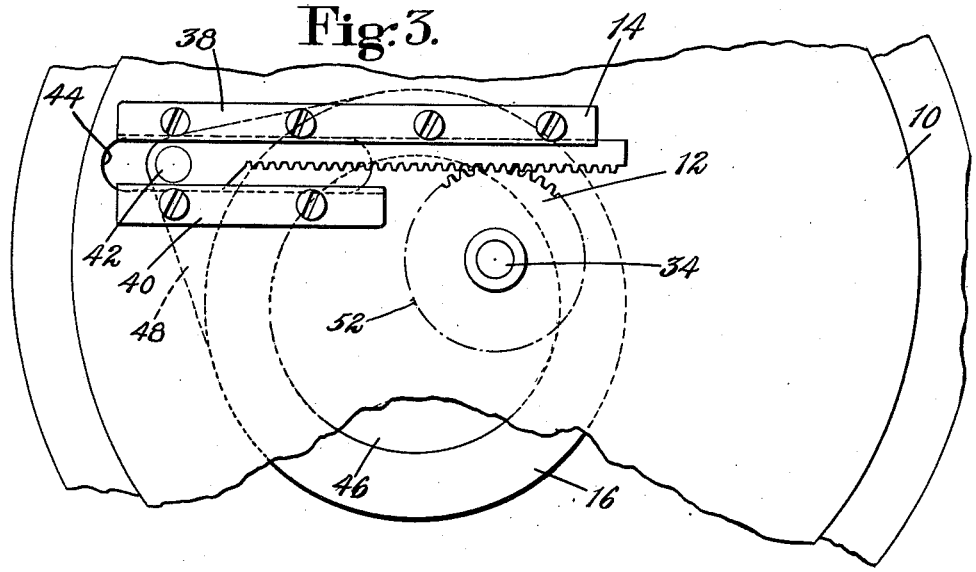
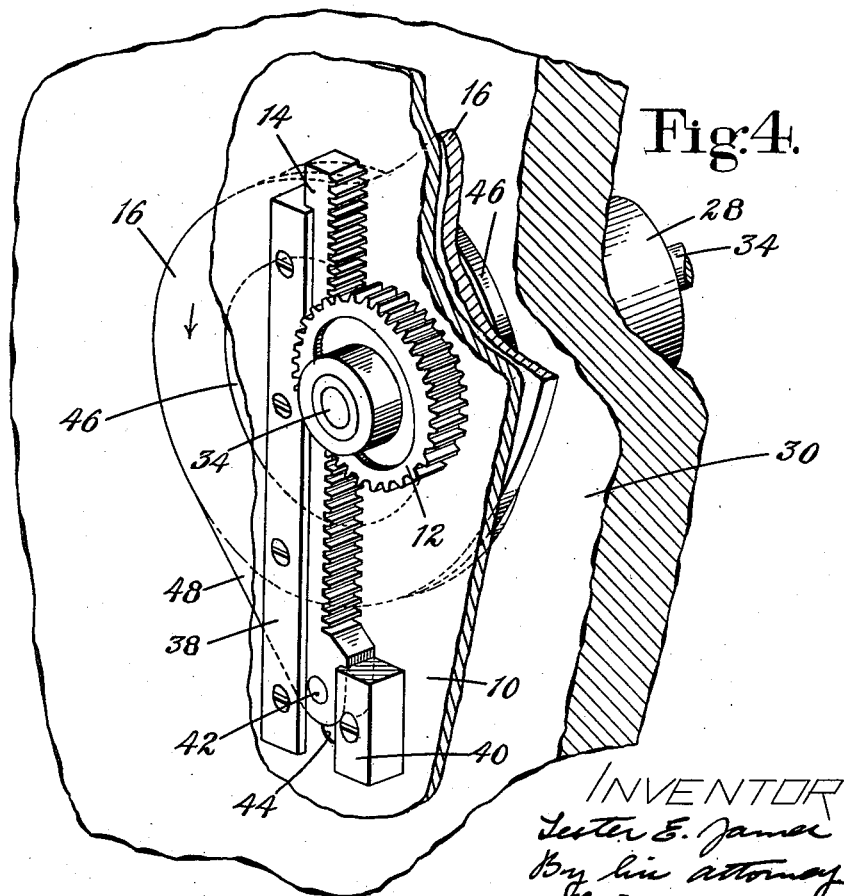
INVENTOR
Lester E. James
By his attorney
Victor Coll Fig. 5.
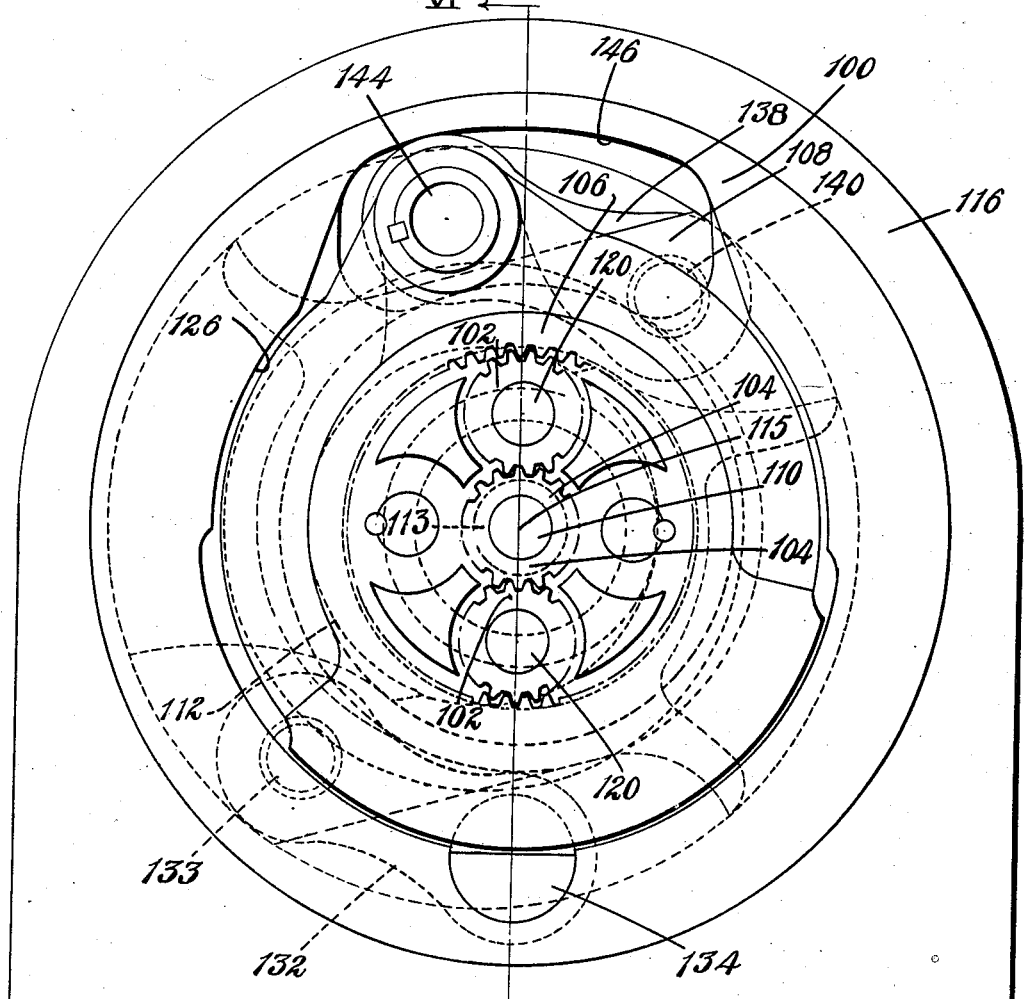
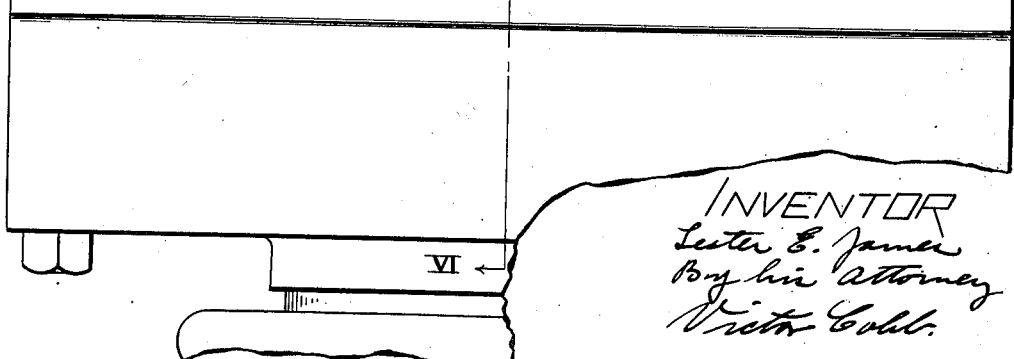

Jan. 26, 1943.   L. E. JAMES   2,309,595
MECHANICAL MOVEMENT
Filed Dec. 7, 1940   7 Sheets-Sheet 7

Patented Jan. 26, 1943

2,309,595

UNITED STATES PATENT OFFICE 2,309,595

MECHANICAL MOVEMENT

Lester E. James, Swampscott, Mass., assignor to United Shoe Machinery Corporation, Flemington, N. J., a corporation of New Jersey Application December 7, 1940, Serial No. 368,975

18 Claims. (Cl. 74—394)

This invention relates to mechanical movements and is herein illustrated in connection with devices for causing a driven member to move at a varying speed.

In machines of various types, it is frequently desirable to effect movement of a driven part in such a way that during each cycle of operation its velocity varies from its minimum value or zero to its maximum value, and then back again to the minimum value or zero, and its acceleration is zero or nearly zero at the beginning and at the end of the cycle. Typical examples of such machines are fastening inserting machines in which, in a single cycle of operation, a driving member is started from a position of rest, is moved at high speed during operation upon the work and then is brought to rest; and multi-station machines in which a heavy turret is moved intermittently from one operating station to another, the beginning and end of each movement being at zero velocity and zero or nearly zero acceleration, and the middle portion of the movement being at relatively high velocity. Considerable difficulty has been experienced in devising variable speed drive mechanisms for such machines which will operate smoothly at high speeds. This is partly due to the fact that as the velocity is increased the inertia forces due to the masses of the parts increase as a function of the square of the velocity, with the result that the parts are subjected to great strains and the energy required to operate the devices is greatly increased.

It is an object of the present invention to provide an improved mechanical movement which is particularly efficient in its operation and which will contribute to the smoothness of operation of the machine in which it is incorporated. To this end and as illustrated, I have provided a varying speed device in which there is a driving member and a driven member, an intermediate member which is operated continuously by the driving member and imparts motion to the driven member, together with a control member for causing variations in the operation of the intermediate member to effect movement of the driven member at varying velocity. Preferably, and as shown, the intermediate member is moved in the same direction as the driving member, thus minimizing the forces acting upon the parts during the variation of velocity and acceleration, and thereby minimizing the influence of inertia forces, with the result that the device will operate smoothly. Preferably, too, the arrangement of the parts is such that, though the driving member is operated continuously, the driven member during each cycle of operation moves at a varying velocity, and at the beginning and the end of the cycle the velocity of the driven member is zero, and the acceleration also is zero, or nearly zero. That means, in ordinary language, that the driven member actually stops for an appreciable though very short period of time. This is advantageous in that, for example, a clutching operation can be performed to connect the driven member to an operating instrumentality at such time without a sudden shock, after which the acceleration and velocity are increased gradually to a maximum during the principal part of the operating cycle, and then the acceleration and velocity are gradually decreased until the instrumentality is again brought to rest without shock.

These and other features of the invention are disclosed in the following specification and in the accompanying drawings, and are pointed out in the claims.

In the drawings,

Fig. 3 is a view in front elevation of a portion of the device of Fig. 1, showing the parts in the positions occupied after a rotation through about 240°;

Fig. 4 is a perspective view, partly in section, of the device of Fig. 1;

Fig. 5 is a view in front elevation of a modification of the invention and illustrates a planetary gear variable speed device;

The variable speed mechanism illustrated in Figs. 1, 2, 3 and 4, and which I refer to as the planetary rack device, comprises a driving member in the form of a flywheel 10, a driven member in the form of a pinion 12 rotated by an intermediate member shown as a rack 14 arranged to be moved by the flywheel 10 angularly about the axis of the pinion 12 and in directions tangentially of the pinion 12 under the influence of a control member 16 to effect rotation of the driven member at varying velocity.

Figure 2:
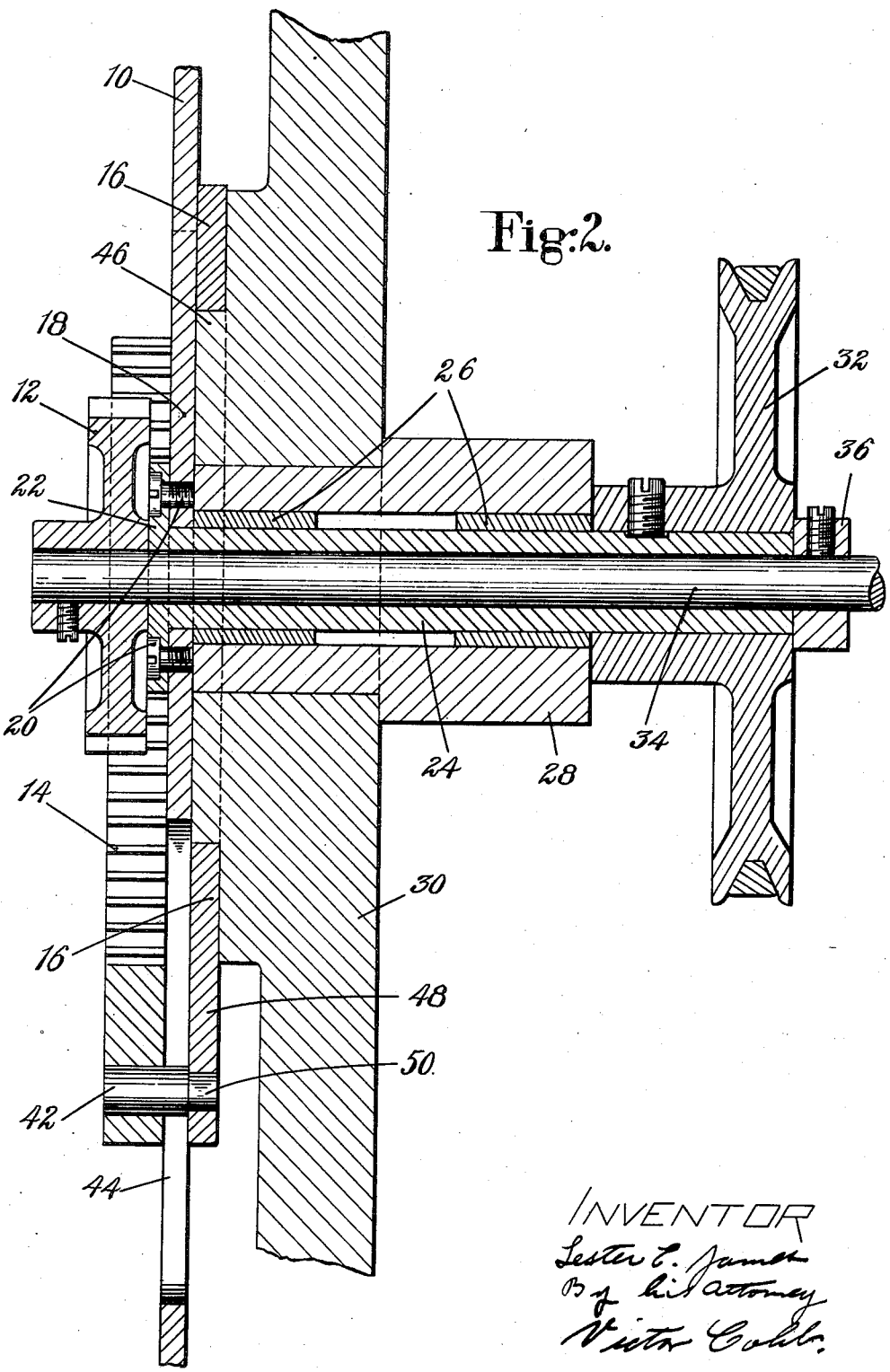
Fig. 2 is a cross sectional view taken along lines II—II of Fig. 1.

The flywheel 10, Fig. 2, comprises a plate 18 secured by screws 20 to a flange 22 on one end of a sleeve 24 which is mounted in bearings 26 positioned in a bushing 28 carried by a housing 30. The flywheel is arranged to be continuously rotated by a pulley 32 keyed to the other end of the sleeve 24.

The pinion 12 is keyed to a shaft 34 mounted in the sleeve 24 for rotation relatively thereto. Endwise movements of the shaft are prevented by engagement of the pinion 12 and a collar 36 with opposite ends of the sleeve 24. The shaft 34 constitutes a driven shaft which can be connected by any suitable means to an operating instrumentality, not shown.

Figure 1:
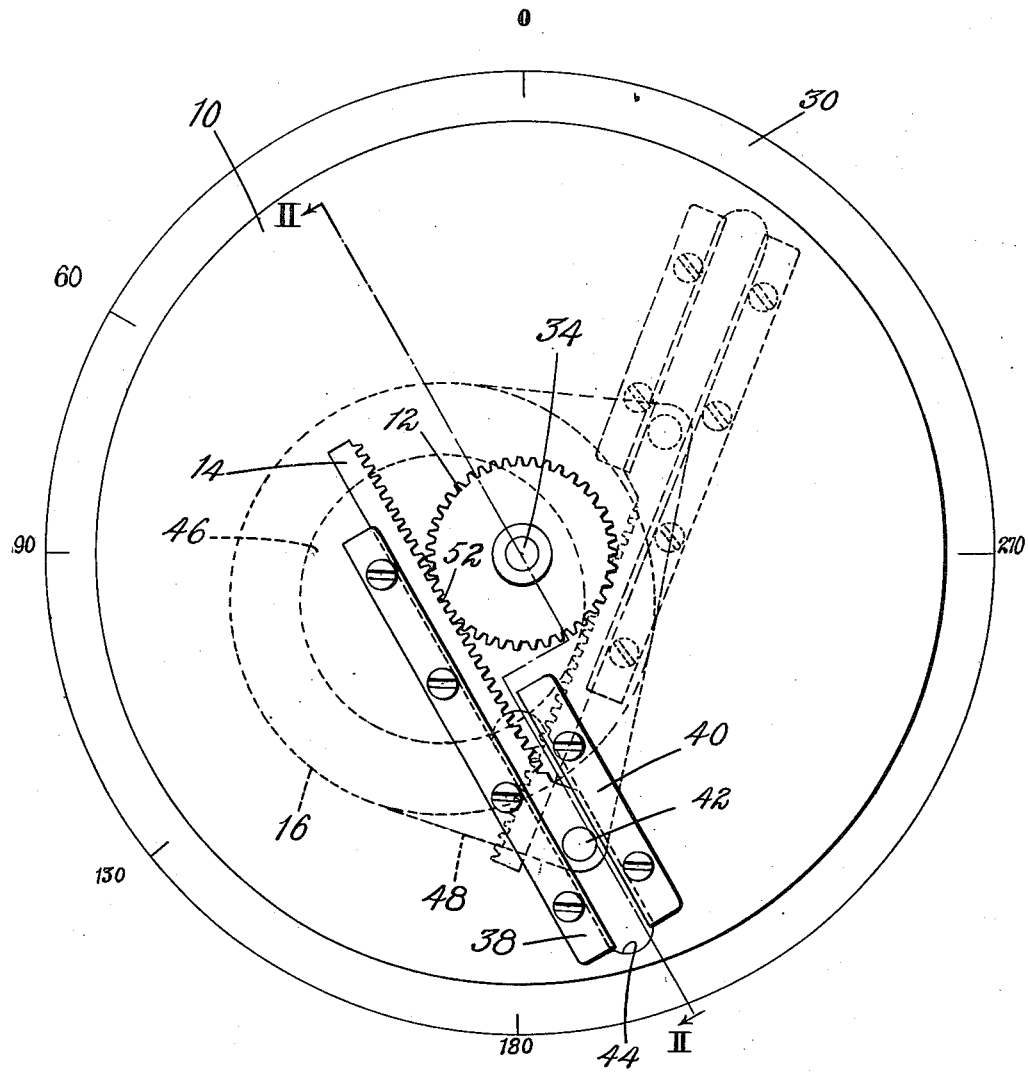
Fig. 1 is a front elevation of a variable speed device embodying one form of my invention and illustrates a planetary rack variable speed device.

The rack 14 is mounted in flanged guideways 38 and 40, Figs. 1, 3 and 4, for sliding movement along the outer face of the flywheel 10. The guideways hold the rack continuously in mesh with the pinion 12 with the pitch line of the rack tangent to the pitch line of the pinion irrespective of the angular position of the rack. One end of the rack 14 carries a pin 42 which is positioned in an elongated slot 44 in the flywheel and forms a driving connection for rotating the rack about the pinion 12.

The control member 16 comprises a plate rotatably mounted upon a dead center or boss 46 on the housing 30. The control member 16 has an arm 48, the end portion of which is secured to a reduced portion 50, Fig. 2, of the driving pin 42. It is to be noted that the axis 52, Figs. 1 and 3, of the boss 46, about which the control member 16 rotates, passes through a point which lies in the pitch circle of the pinion 12, with the result that the control member 16 constrains movement of the pin 42 to a circle which is eccentric to the axes of the pinion 12 and flywheel 10 by a distance equal to the radius of the pitch circle of the pinion. As the flywheel 10 rotates the rack 14 about the axis of the pinion 12, the rack 14, by reason of this eccentricity, is moved tangentially of the pinion 12 during portions of each cycle of rotation, thus effecting rotation of the pinion and its associated shaft 34.

As the parts are rotated, the resultant motion can be said to consist in a progressive wrapping or rotation of the rack 14 on the periphery of the pinion 12 about successive points of tangency which does not effect rotation of the pinion, and movements of the rack tangentially of the pinion at a varying velocity in the same direction, resulting in an intermittent rotation of the pinion 12 in the same direction as the driving member or flywheel 10.

The amount of wrapping and tangential movements of the rack, during its rotation about the axis of the pinion 12, varies due to the eccentricity of the path of the rack pin 42 relatively to the axis of the pinion. In the position of the device as shown in full lines in Fig. 1, which may be called the zero position, the direction of movement of the rack 14 is substantially a movement of rotation about the axis 52, or a "wrapping" of the rack about the pinion. There is no tangential movement of the rack relatively to the pinion, and consequently no rotation of the pinion. As the rack is moved from this position toward that shown in dotted lines in Fig. 1, through a rotation of about 120°, the rack rotates about successive points of tangency of the gear, but also moves tangentially thereof in the direction of rotation, the velocity of the tangential movement increasing as the pin 42 approaches the axis of the pinion 12. Upon rotation of the flywheel through about 200°, the parts take the position shown in Fig. 3, at which time the movement of the rack is largely in a direction tangential to the pinion 12, and there is very little wrapping of the rack about the pinion. This position of the parts is the one in which the pinion 12 is being rotated at its maximum velocity.

Figure 8:
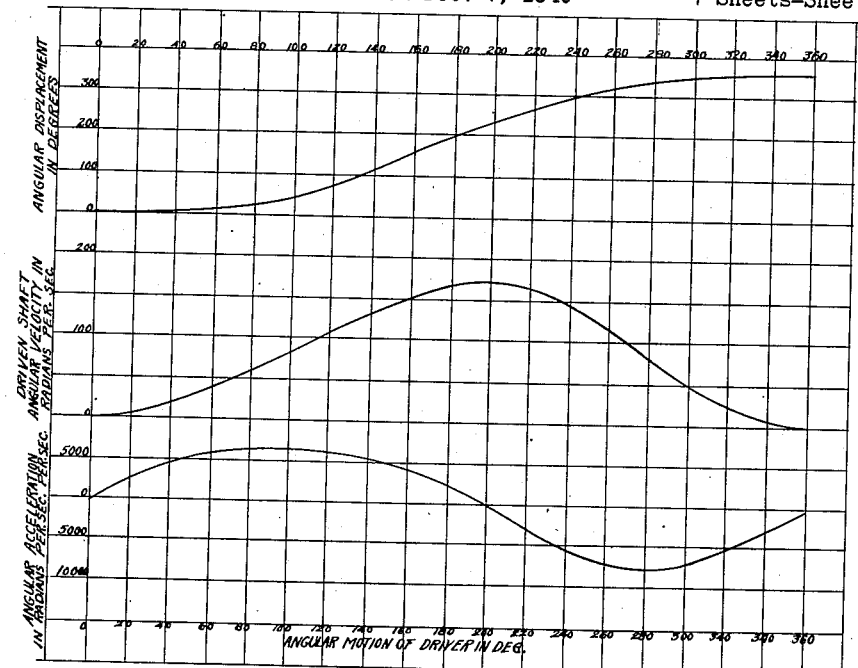
Fig. 8 is a chart illustrating the operation of the planetary rack device.

Fig. 8 is a chart comprising curves illustrating the manner in which the planetary rack device operates. These curves show the angular displacement of the driven member, its angular velocity and its angular acceleration, respectively, plotted against the angular motion of the driving member or flywheel when the latter is rotating at about 800 R. P. M. It is to be noted that during each cycle of operation the driven member, which at the zero point is at rest, has imparted to it a gradually increasing acceleration and velocity, until its maximum velocity is reached at about 200°, after which the driven member is decelerated and its velocity gradually decreased until the member is brought to rest. The acceleration at the beginning and end of each cycle is zero, or substantially zero, and the angular displacement or rotation of the driven member is very slight for about 40° upon each side of its rest position, with the result that the member is started and stopped without substantial shock.

It is to be noted that the movement of the rack 14 is always in the direction of the movement of the driving member 10, with the result that the forces exerted upon the pinion 12 under load are always in the same direction. This contributes to the smoothness of operation of the device.

Figure 6:
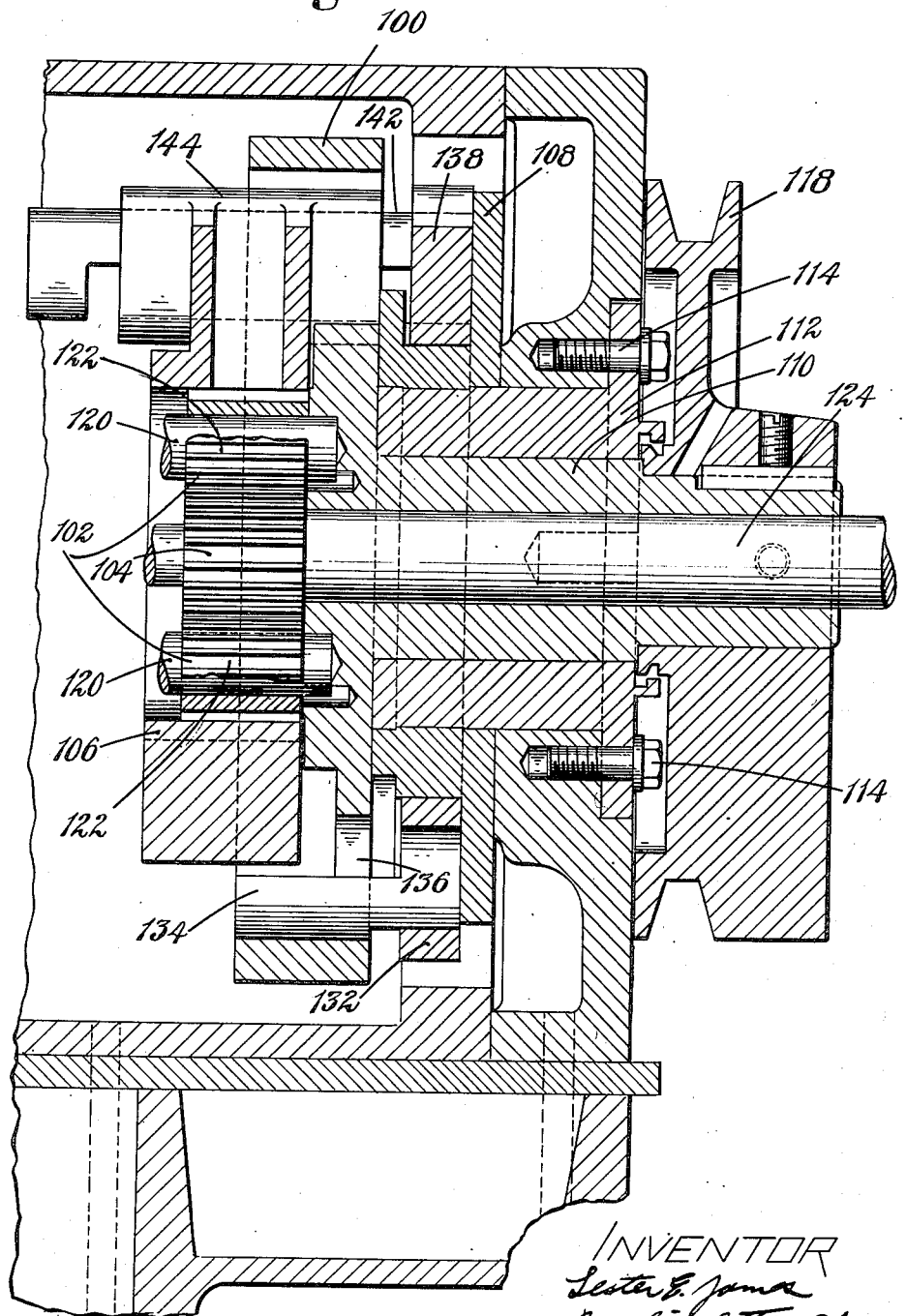
Fig. 6 is a cross sectional view taken along lines VI—VI of Fig. 5.
Figure 7:
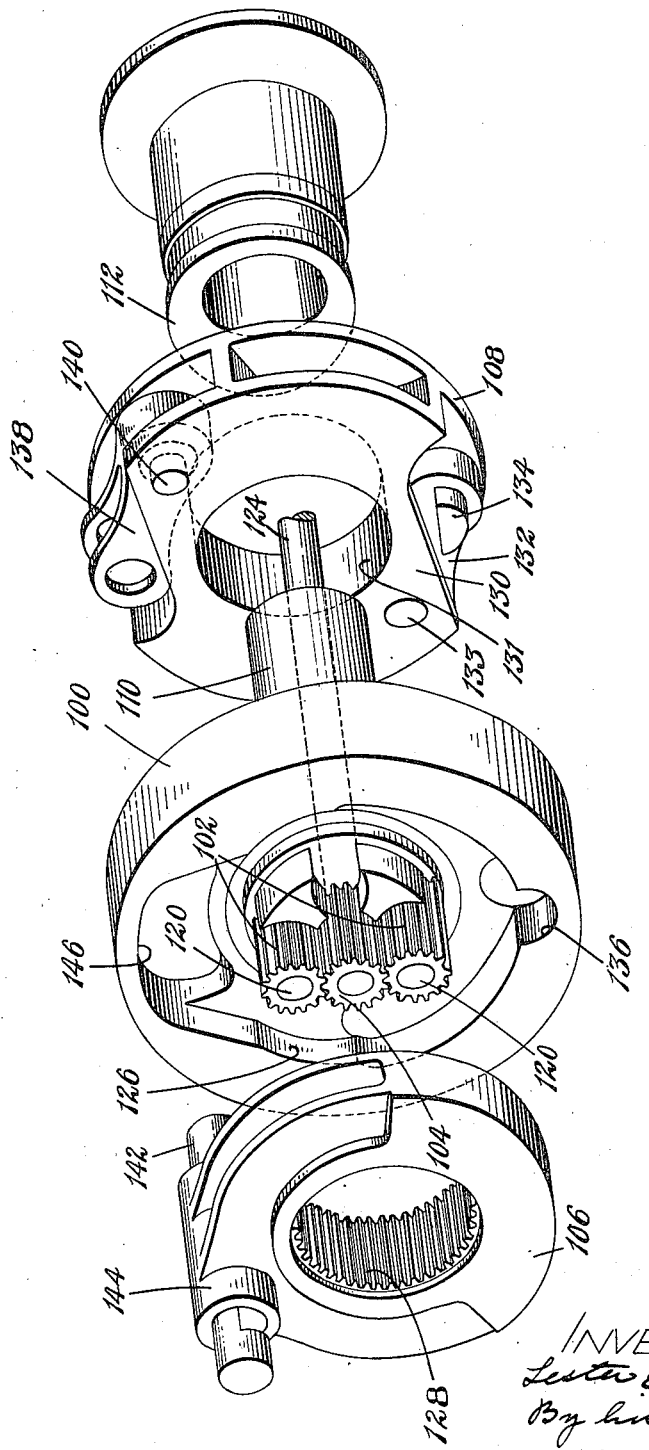
Fig. 7 is an exploded perspective view of the planetary gear device.

Another form of the invention, which I refer to as the planetary gear device, is illustrated in Figs. 5, 6 and 7. This device comprises a driving member in the form of a flywheel 100 carrying planetary gears 102 in mesh with a driven member in the form of a sun gear 104, the planetary gears 102 also being in mesh with an intermediate member shown as a ring gear 106, which is automatically moved angularly relatively to the flywheel 100, during rotation of the latter, by a control member 108 to cause the planetary gears to impart to the driven gear rotative movement at varying velocities.

The driving member or flywheel 100 has integral therewith a sleeve 110, Figs. 6 and 7, which is mounted in a bushing 112 secured by bolts 114 to a housing 116. The flywheel 100 is arranged to be continuously rotated by a pulley 118, which is keyed thereto. The central portion of the flywheel carries a plurality of studs 120 upon which the planetary gears 102 are loosely mounted. Only two of such gears are shown in the drawings, but spaces for two more are provided, if desired, in order to produce a better balanced construction.

The driven member or sun gear 104, which is continuously in mesh with the planetary gears 102, is carried at the outer end of a shaft 124, which is mounted in the sleeve 110 for rotation relatively to the flywheel 100. The inner end of the shaft 124 can be connected by any suitable mechanism to an operating instrumentality, not shown.

The intermediate member or ring gear 106 comprises a body portion arranged to be received in a recess 126 in the flywheel, and has internal teeth 128 which are continuously in mesh with the planetary gears 102. The control member 108 comprises a body portion 130 having a bore 131, which surrounds the bushing 112, the outer surface of which is cylindrical in shape, its axis 113 being eccentric to the axis 115 of the sleeve 110, so that upon rotation the control member 108 will revolve eccentrically of the axis of the flywheel. The control member 108 is continuously rotated in the same direction as the flywheel by means of a connection with the flywheel comprising a link 132 pivoted at 133 on the control member and carrying a pin 134, which is received in a groove 136 in the flywheel. There is provided a driving connection between the control member 108 and the ring gear 106, comprising a link 138 pivotally mounted upon the control member at 140 and receiving a pin 142, carried by a boss 144 on the ring gear, and extending through an enlarged opening 146 in the flywheel 100.

In the operation of the device, as the flywheel 100 is continuously rotated, the control member 108 and the ring gear 106 are rotated in the same direction. If it were not for the eccentric mounting of the control member, the ring gear would be effective continuously through the planetary gears 122 to drive the sun gear 104 and the shaft 124 in the same direction and at the same velocity as the flywheel. However, because of the eccentricity of the mounting of the control member, during each cycle of operation the control member, acting through the pin 142 and projection 144, varies the position of the ring gear 106 angularly relatively to the flywheel, with the result that the planetary gears 102 are rotated on their studs in addition to their bodily movement caused by the flywheel, in such manner that they drive the sun gear 104 at a varying velocity ranging from zero to approximately twice the velocity of the flywheel.

The operation of the planetary gears 102 can be said to be made up of two motions comprising a movement angularly about the axis of the sun gear 104 at the same velocity as the flywheel 100, which tends to rotate the gear 104 at the same velocity and in the same direction as the flywheel 100; and a rolling movement of the planetary gears 102 along the periphery of the sun gear 104 under action of the control member 108, which rotates the ring gear 106 alternately faster and slower than the flywheel, causing variations in the velocity of the sun gear. When the ring gear 106 is moved faster than the flywheel 100, the planetary gears 102 are rotated upon their studs in a direction to compensate, to a greater or less extent, for the bodily movement of the gears 102 about the axis of the sun gear 104, thus driving the sun gear at a velocity less than that of the flywheel and which at one point in the cycle is zero. When the ring gear 106 is moved at a velocity less than that of the flywheel 100, the reverse is true and the sun gear 104 is driven at a velocity greater than that of the flywheel 100 and at one point in the cycle its velocity is twice that of the flywheel 100. The point at which the velocity of the driven or sun gear 104, in the illustrated construction, is zero occurs at about 30° in a counterclockwise direction from a line between the axis of the sun gear 104 and the axis about which the control member revolves, and which can be considered the zero position of the parts. The position of the parts for maximum velocity of the sun gear 104 is about 180° from the zero position. It is to be noted that by changing the eccentricity, that is, the distance between the axes 115, 113, of the sun gear and control member, considerable variation in the motion of the driven gear could be obtained.

Figure 9:
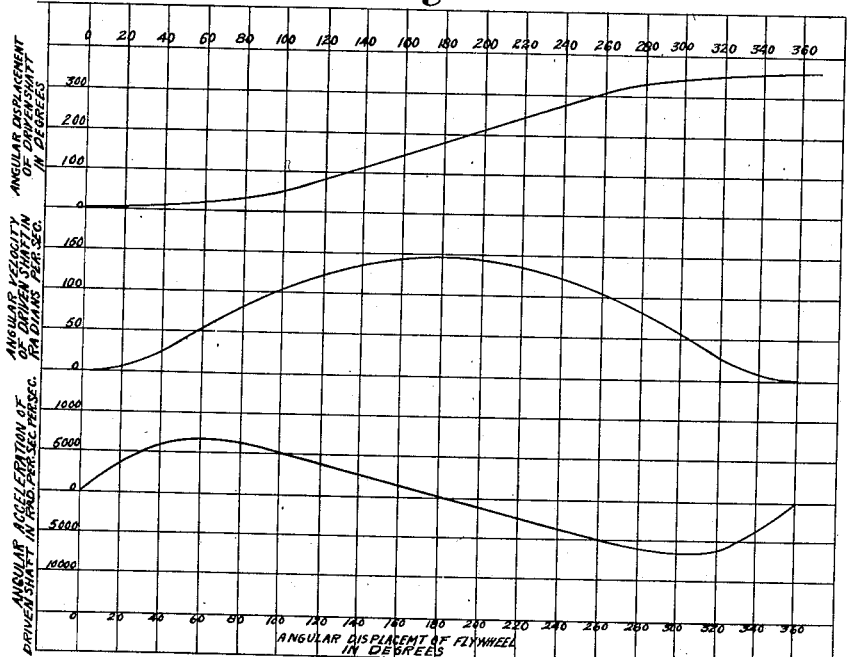
Fig. 9 is a chart illustrating the operation of the planetary gear device.

Fig. 9 is a chart comprising curves illustrating the manner in which the planetary gear device operates, when the flywheel is rotating at about 800 R. P. M. These curves show the angular displacement of the driven member, its velocity and its angular acceleration, respectively, plotted against the angular motion of the driving member or flywheel.

The variation in the movement of the ring gear under action of the control member results in driving the driven member or sun gear 104 and its shaft 124 during each cycle of operation, in such manner that the sun gear is rotated from a position of rest without shock with gradually increasing acceleration and velocity, until the maximum is reached at about 180°, after which the driven member is decelerated and its velocity is decreased, and the gear is brought to rest without shock. It is to be noted that the motions of all the driving parts are continuously in the same direction, and that the ring gear 106, while it rotates back and forth relatively to the flywheel 100, does not reverse its direction. Thus the inertia forces of the parts act in the same direction of rotation, which contributes greatly to the smoothness of operation of the device. Furthermore, the masses of the parts are concentrated close to the axis of the driven member, which also operates to relieve the parts from strain and further contributes to smooth operation.

Having described my invention, what I claim as new and desire to secure by Letters Patent of the United States is:

1. A mechanical movement comprising a continuously rotating driving member, a driven member mounted coaxially of the driving member for rotation relatively thereto, an intermediate member operatively connecting the driving and driven members and mounted for rotation bodily completely around the axis of the driven member, and a control member operated by the driving member for varying the position of the intermediate member relatively to the driving member during its bodily movement, thereby varying the velocity of the driven member.

2. A mechanical movement comprising a continuously rotating driving member, a driven gear mounted coaxially of the driving member for rotation relatively thereto, a toothed member operatively connected to the gear and to the driving member for rotation therewith continuously in the same direction, and a control member mounted for rotation about an axis eccentric to the driving and driven members and operatively connected to the toothed member for shifting position of the same relatively to the driving member, thereby effecting variation in the velocity of the gear.

3. A mechanical movement comprising a continuously rotating driving member, a driven gear mounted coaxially of the driving member for rotation relatively thereto, a toothed intermediate member connected to the driving member and mounted for rotation continuously in the same direction as the driving member, said intermediate member being operatively connected to the gear, and a rotatable control member mounted eccentrically of the driving and driven members for shifting the position of the intermediate member relatively to the driving member, thereby effecting variation of the velocity of the driven member.

4. A mechanical movement comprising a rotary driving member, a driven gear mounted coaxially of the driving member, a toothed member operatively connected to the driven gear and to the driving member for angular movement with the latter continuously in the same direction about the axis of the driven member, and a rotary control member for shifting the position of the intermediate member outwardly of the axis of the driving member, thereby effecting variation in the velocity of the driven gear.

5. A mechanical movement comprising a rotary driving member, a driven gear, a toothed intermediate member in mesh with the driven member and mounted for movement angularly about the axis of the driven member continuously in the same direction under actuation of the driving member, and a rotary control member mounted eccentrically of the driven member and connected to the intermediate member for varying the position of the intermediate member peripherally of the driven member, thereby effecting variation of the velocity of the driven member.

6. A mechanical movement comprising a continuously rotating driving member, a driven gear, an intermediate member having teeth in mesh with the driven gear, a connection between the driving member and the intermediate member for moving the latter bodily about the axis of the driven gear continuously in the same direction, a control member mounted for rotation about an axis eccentric to that of the driven member, and a connection between the control member and the intermediate member for shifting the teeth of the intermediate member along the periphery of the driven gear in the direction of rotation of the driving member during bodily movement of the intermediate member about the axis of the driven gear.

7. A mechanical movement comprising a continuously rotating driving member, a driven member mounted coaxially of the driving member for rotation relatively thereto, an intermediate member operatively connecting the driving and driven members and rotatable about the axis of the driven member continuously in the same direction, a control member mounted for rotation about an axis eccentric to the axis of the driven member, and a connection between the control member and the intermediate member for varying the position of the intermediate member relatively to the driving and driven members, thereby varying the velocity of the driven member.

8. A mechanical movement comprising a continuously rotating driving member, a driven member mounted coaxially of the driving member for rotation relatively thereto, an intermediate member operatively connecting the driving and driven members and rotatable about the axis of the driven member, a control member rotated by the driving member, and means for mounting the control member for rotation about an axis eccentric to the axis of the driven member, the eccentricity of the axes being such that the control member effects variation of the velocity of motion in the same direction of the intermediate member relatively to the driven member, thereby effecting variation in the movement of the driven member during each cycle such that both the velocity and acceleration at the beginning and end of the cycle are approximately zero.

9. A mechanical movement comprising a toothed driving member, a driven gear continuously in mesh with the driving member, means for rotating the driving member bodily about the axis of the driven gear continuously in the same direction, and means for shifting the driving member circumferentially along the driven gear at a varying velocity, thereby causing rotation of the driven gear at a varying velocity.

10. A mechanical movement comprising a driving member, a driven member mounted for rotation about its axis, an intermediate member mounted for movement about the axis of the driven member and arranged to be driven continuously in the same direction by the driving member, a connection between the intermediate member and the driven member for causing rotation of the latter about its axis, and means operated by the driving member for oscillating the connection about the axis of the driven member, thereby varying the velocity of the driven member.

11. A mechanical movement comprising a driving member rotated at constant speed, a rotary driven gear, a pin, means mounting the pin for movement about an axis eccentric to that of the driving member and arranged to be driven continuously by the driving member, and a rack slidably mounted upon the driving member and pivotally mounted upon the pin and meshing with the driven gear to cause rotation of the same at a varying velocity.

12. A mechanical movement comprising a rotary driving member, a driven gear mounted coaxially of the driving member for rotation relatively thereto, an arm mounted for rotation about an axis eccentric to that of the driving member, a pin carried by the arm, a rack mounted upon the pin and meshing with the driven gear, and guide members on the driving member engaging the rack to rotate the same about the axis of the gear, thereby effecting rotation of the gear at a varying velocity.

13. A mechanical movement comprising a pinion mounted for rotation about its axis, a driving member mounted for rotation co-axially of the pinion, a pin, means mounting the pin for rotation about an axis eccentric to the axis of the pinion, and a rack slidably mounted upon the driving member and continuously in mesh with the pinion for driving the pinion at a varying velocity during each cycle of rotation of the pin.

14. A mechanical movement comprising a flywheel, a pinion mounted coaxially of the flywheel for rotation relatively thereto, a pin, means mounting the pin for rotation about an axis eccentric to the axis of the flywheel, a rack carried by the pin and continuously in mesh with the pinion, and a connection between the flywheel and the rack for rotating the pin and rack to effect angular movement of the rack about the pinion and movement of the rack tangentially of the pinion, thereby causing rotation of the pinion at a varying velocity.

15. A mechanical movement comprising a sun gear, a planetary gear in mesh with the sun gear, means for moving the planetary gear about the axis of the sun gear, a ring gear surrounding the sun gear and the planetary gear and continuously in mesh with the planetary gear, and means for rotating the ring gear at an angular velocity which is varied relatively to the angular velocity of the planetary gear about the axis of the sun gear, thereby causing rotation of the sun gear at a varying velocity.

16. A mechanical movement comprising a sun gear, a flywheel, planetary pinions rotatably mounted upon the flywheel and meshing with the sun gear for driving the same, a ring gear meshing with the planetary pinions, a control member mounted for rotation about an axis eccentric to the axis of the flywheel, connections between the flywheel and the control member for rotating the latter in the same direction as the flywheel, and connections between the control member and the ring gear for moving the ring gear relatively to the flywheel during rotation of the latter, thereby varying the angular velocity of the pinions and effecting variation of the velocity of rotation of the sun gear.

17. A mechanical movement comprising a driving member operating at constant speed, a driven gear located within the driving member and coaxial therewith, a ring gear surrounding the driven gear and operatively connected to the driving member for rotation therewith, planetary gears engaging the ring gear and the driven gear by which the latter is rotated, a stationary shaft mounted eccentric to the axis of the driven member, a control member rotatably mounted upon the last-mentioned shaft, connections between the control member and the driving member, and other connections between the control member and the ring gear for causing rotation of the ring gear at varying velocity about the axis of the driven gear during rotation of the parts, thereby varying the speed of the driven gear.

18. A mechanical movement comprising a continuously rotating flywheel, a driven sun gear mounted coaxially of the flywheel for rotation relatively thereto, a planetary gear carried by the flywheel and meshing with the sun gear, a ring gear in mesh with the planetary gear and rotatable about the axis of the sun gear, a control member mounted for rotation about an axis eccentric to that of the flywheel, a link connection between the flywheel and the control member for rotating the latter in the same direction as the flywheel, and a connection between the control member and the ring gear to effect rotation of the ring gear in the same direction as the flywheel at a varying velocity relatively thereto to effect rotation of the sun gear at a varying velocity during each cycle of operation.

LESTER E. JAMES.